(No Model.)
W. PETERS.
PLATFORM GEAR FOR WAGONS.
No. 245,396. Patented Aug. 9, 1881.
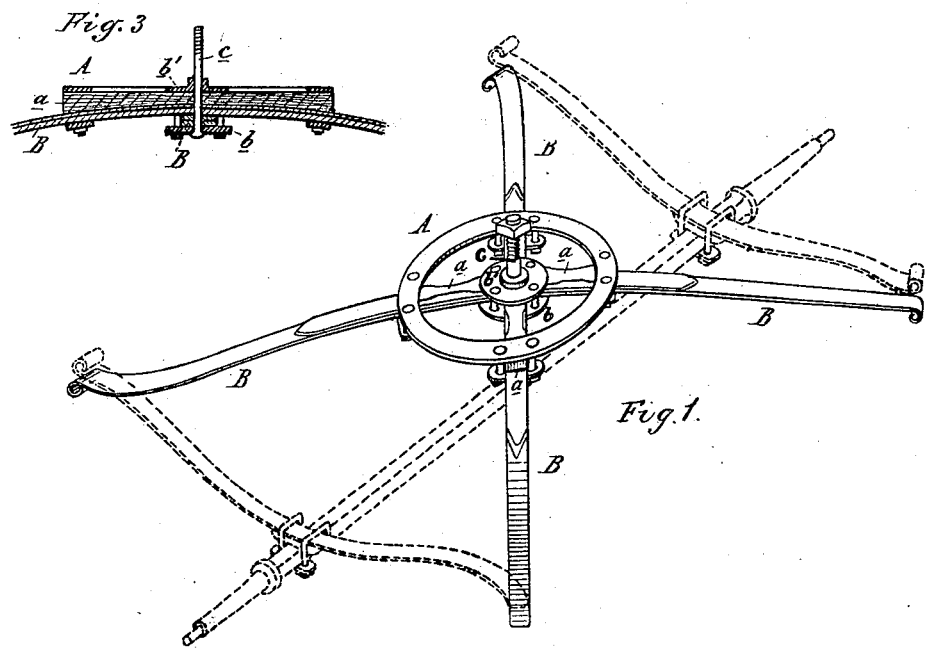
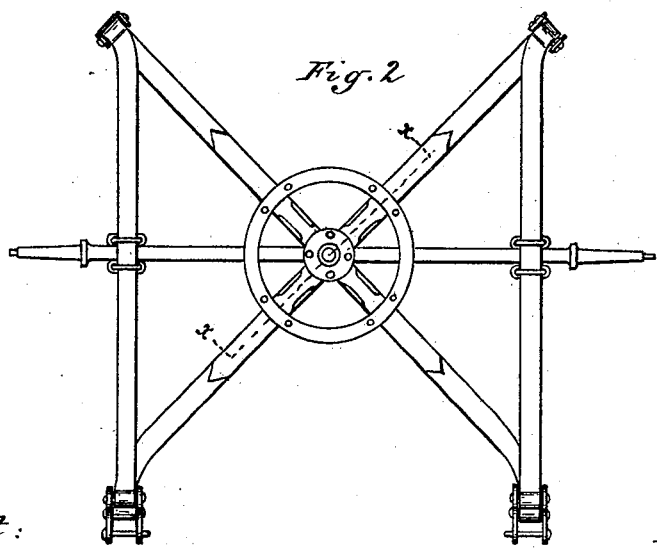
Attest:
A. Barthel
E. Scully.
Inventor:
William Peters
by Thos. S. Sprague
Atty

UNITED STATES PATENT OFFICE.

WILLIAM PETERS, OF PETTYSVILLE, MICHIGAN.

PLATFORM-GEAR FOR WAGONS.

SPECIFICATION forming part of Letters Patent No. 245,396, dated August 9, 1881.

Application filed April 13, 1881. (No model.)

*To all whom it may concern:*

Be it known that I, WILLIAM PETERS, of Pettysville, Livingston county, Michigan, have invented an Improvement in Platform-Gears, of which the following is a specification.

The object of my invention is so to construct a platform for supporting the fifth-wheel of a carriage or wagon as to combine lightness with strength, and to provide a flexibility to such platform; and to that end my invention consists in forming such platform of suitable crossed springs, the outer ends of which are secured to the platform-springs, all as more fully hereinafter set forth.

In the accompanying drawings, which form a part of this specification, Figure 1 represents a perspective view; Fig. 2, plan view, showing the springs connected to a platform; and Fig. 3 a cross-section through the lines $x$, Fig. 2, showing the manner of crossing and securing the springs.

A represents the lower member of the fifth-wheel, the upper member of which is secured to the carriage or wagon. This wheel A is supported by and clipped to the crossed springs B in any desired substantial manner, there being filling-blocks $a$ interposed between the wheel and the spring sufficient to make said wheel level with the gear. The platform-springs, as ordinarily used in gears of this kind, are secured by any proper means to the outer ends of these cross-springs B.

By this construction I provide a strong and light support for the fifth-wheel, while I gain the elasticity of the springs forming such support, which renders the wagon or carriage very easy in its riding.

While I show and describe the springs as being continuous from end to end, crossing each other at their centers, it is evident that such support could be formed of four separate springs properly clipped to a casing which carries the fifth-wheel, though I prefer the former, as illustrated in the accompanying drawings.

The springs are clamped together at the center by plates $b$ $b'$ and bolts passing through said plates, the upper plate, $b'$, being provided with a rigid king-bolt, $c$, as represented.

What I claim as my invention is—

1. A support for the fifth-wheel of a carriage composed of springs crossing each other at the center and clamped together by plates $b$ $b'$, substantially as described.

2. In a fifth-wheel support, the springs B, clamped together by central plates, $b$ $b'$, the upper of which carries the king-bolt $c$, substantially as and for the purpose described.

WILLIAM PETERS.

Witnesses:
T. J. W. ROBERTSON,
E. SCULLY.